United States Patent
Tang et al.

(10) Patent No.: US 11,365,127 B2
(45) Date of Patent: Jun. 21, 2022

(54) LARGE-PARTICLE SPHERICAL SALT AND PREPARATION METHOD THEREOF

(71) Applicant: TIANJIN UNIVERSITY OF SCIENCE AND TECHNOLOGY, Tianjin (CN)

(72) Inventors: Na Tang, Tianjin (CN); Min Lu, Tianjin (CN); Wei Du, Tianjin (CN); Penggao Cheng, Tianjin (CN); Jun Xiang, Tianjin (CN); Lei Zhang, Tianjin (CN); Songbo Wang, Tianjin (CN); Jianping Zhang, Tianjin (CN)

(73) Assignee: TIANJIN UNIVERSITY OF SCIENCE AND TECHNOLOGY, Tianjin (CN)

( * ) Notice: Subject to any disclaimer, the term of this patent is extended or adjusted under 35 U.S.C. 154(b) by 0 days.

(21) Appl. No.: 17/402,565

(22) Filed: Aug. 15, 2021

(65) Prior Publication Data
US 2021/0371292 A1 Dec. 2, 2021

Related U.S. Application Data

(63) Continuation of application No. PCT/CN2020/115974, filed on Sep. 17, 2020.

(30) Foreign Application Priority Data

Apr. 3, 2020 (CN) .......................... 202010257039.7

(51) Int. Cl.
*C01D 3/24* (2006.01)

(52) U.S. Cl.
CPC ............ *C01D 3/24* (2013.01); *C01P 2004/32* (2013.01); *C01P 2004/60* (2013.01); *C01P 2004/61* (2013.01)

(58) Field of Classification Search
CPC ................................. C01D 3/04; C01D 3/24
See application file for complete search history.

(56) References Cited

U.S. PATENT DOCUMENTS 3,891,544 A * 6/1975 Becker ................ C01D 3/08
209/166
9,491,961 B2 * 11/2016 Minter .................. A23L 27/10

2005/0076477 A1    4/2005 Demmer et al.
2015/0191361 A1 *  7/2015 Spijkman ............... C01D 3/04
423/499.4
2017/0341949 A1   11/2017 Schuessler et al.

FOREIGN PATENT DOCUMENTS

| CN | 1674966 A | 9/2005 |
| CN | 103588224 A | 2/2014 |
| CN | 104876246 A | 2/2015 |
| CN | 106430251 A | 2/2017 |
| CN | 107572559 A | 1/2018 |
| CN | 111302362 A | 6/2020 |
| EP | 0733590 A | 9/1996 |

OTHER PUBLICATIONS

Jamaludin et al, "Thermal studies of Arabic gum—carrageenan polysaccharides film", Chemical Engineering Research Bulletin 19 (2017) pp. 80-86. (Year: 2017).*
Xianfen Weng; "Preparation of Large Size Sodium Chloride"; J. Salt and Chem. Ind.; Sep. 2009; pp. 18-19 & 28; China Academic Journal Electronic Publishing House; Beijing, China.
International Search Report; International Pat. Appl. No PCT/CN2018/080544 dated Jun. 22, 2018; 4 pages.; International Searching Authority, State Intellectual Property Office of the P.R. China; Beijing, China.

* cited by examiner

*Primary Examiner* — Ngoc-Yen Nguyen
(74) *Attorney, Agent, or Firm* — Andrew D. Fortney; Central California IP Group, P.C.

(57) ABSTRACT

A large-particle spherical salt with a particle size of 400-950 μm and a sphericity of 0.5-1.0 is disclosed, which overcomes the existing difficulty in this field for larger particle size as well as higher sphericity. A preparation method of the large-particle spherical salt is also disclosed, wherein in one preparation process, 2% of gum arabic (based on the mass percentage of solute sodium chloride in a sodium chloride saturated solution) is added, and under conditions of an evaporating temperature of 60° C. a stirring rate of 350 rpm, and an evaporating time of 8 hours, a large-particle spherical salt with a particle size of 921.593 μm and an average sphericity of 0.904 is successfully prepared. The large-particle spherical salt prepared by the method has a uniform particle size distribution and good appearance, can be combined with other substances, adding some extra value to the salt. Meanwhile, the large-particle spherical salt prepared by the method has a high safety grade (e.g.: food grade) and can be used as edible salt, nutrient salt or foot bath salt.

18 Claims, 5 Drawing Sheets

LARGE-PARTICLE SPHERICAL SALT AND PREPARATION METHOD THEREOF

CROSS-REFERENCE TO RELATED APPLICATIONS

This application is a continuation of International Pat. Appl. No. PCT/CN2020/115974, filed Sep. 17, 2020, pending, which claims the benefit of Chinese Patent Application No. 202010257039.7, filed on Apr. 3, 2020, incorporated herein by reference in its entirety.

TECHNICAL FIELD

The invention relates to the technical field of salt science, in particular to a large-particle spherical salt and a preparation method thereof.

BACKGROUND

Sodium chloride with its wide applications, is a very important chemical raw material, the consumption amount of which is one of the important measures of industrialization degree of a nation. As time goes on, the application field of sodium chloride is continuously expanding, and people are pursuing higher and higher quality salt. However, sodium chloride crystals are extremely easy to agglomerate, which has been a problem needing to be solved for a long time, especially during damp and hot seasons, long-term storage and lump extrusion. The agglomerate destroy's the free-flowing state of the product, and the product needs to be crushed before use, which is a great inconvenience. At the same time, common sodium chloride has a low price and a low added value.

In order to prevent sodium chloride crystals from agglomerating, there are mechanical methods, physical methods and additive methods available at present. The mechanical methods are based on a salt consolidation mechanism: air is pressed into a salt accumulation layer at certain intervals when weak bonding generated by just-bonded point cross-linking is not firm in the moisture absorbing and releasing processes of salt crystalline particles. Vibration during air pressing changes the relative positions of the salt particles, which are separated to form firm crosslinking bonding, therefore the salt consolidation is prevented. The method has the defects of harsh storage conditions, high power consumption, limited storage capacity, etc. Therefore, this method is not widely adopted. The physical methods to prevent the consolidation of salt mainly include controlling the conditions for storing salt, such as the environmental humidity, temperature, pressure, etc. But these conditions are not easily controllable, and the physical methods do not result in satisfactory anti-agglomeration. Most widely used methods in many countries for industrial production to prevent salt consolidation are additive methods. However, the additives widely selected by countries outside of China are ammonium ferric citrate, ferrous phosphate and the like, while in China, $K_4[Fe(CN)_6]$ is the main additive at present to prevent salt consolidation. $K_4[Fe(CN)_6]$, also called potassium ferrocyanide, is a yellow crystal or powder, which can be dissolved in water and acetic acid, but not in alcohol. When it is heated to 60° C., it will lose its water of crystallization, and when heated at higher temperatures, it will decompose and become toxic. Therefore, in the production process of table salt, a certain (but not excessive) amount of $K_4[Fe(CN)_6]$ is added to prevent agglomeration, and the adding operation must be uniform during the addition process. After long-term observation and testing in production practice, it has been found that neither a proper amount nor addition uniformity is easily achieved by the additive method, regardless of the adding point or the adding method, since the additive solution can be sprayed onto only the surface layer of the salt in a storage place, whereas the underlying salt in the storage place cannot be sprayed. Therefore, this method cannot be used for the production and long-term storage of sodium chloride.

Compared with cubic salt crystals, spherical salt has a small contact area and good fluidity, and does not easily agglomerate. Thus, some researchers in China and abroad have been working on controlling the morphology of the salt to be spherical Currently, some researchers have added glycine, an additive, to saturated solutions of sodium chloride, to obtain octahedral salts, similar to spheres, that enhance the mobility of the crystals. However, the sphericity of octahedral salts is not high enough and the anti-caking properties of the corresponding salts are not sufficient. Other researchers have controlled the rate of stirring, fraction of vaporization and evaporation intensity to obtain spheroidal salts with large particles, but the sphericity is still not high enough and the fluidity and anti-caking properties of the salt are not good enough. Further, researchers have used a mixed solvent of methanol and water to change the sodium chloride into spherulites in the mixed solution, but the size of the spherulites is relatively small, about 150 μm, which causes the crystals to easily aggregate and thus agglomerate. In summary, it is difficult to obtain salt particles with high sphericity, large crystal size, and excellent flowability and anti-caking properties in the prior art.

In view of the above, it is desirable to prepare large particle spherical salt, with smaller contact area and larger particle size, in order to improve the flowability and anti-caking properties of the product salt. In the crystallization process of sodium chloride, the temperature and the stirring rate have key influence on the appearance and the granularity of the salt crystal: when the evaporation is carried out at high temperature, the condition is beneficial for forming more spherical crystals, but the crystals are mainly nucleated in the crystallization process, so that the granularity of the crystal is very small. When the evaporation temperature is reduced, the evaporation intensity is small, and crystal particles with larger particle sizes are favorably obtained, but the sphericity of the crystals is low and the yield is low. Also, when the stirring rate is too high, the crystals are abraded by collision, which is advantageous in improving the sphericity of the crystals, but the crystal size is rather small due to collision abrasion. And when the stirring speed is too low, the collision and abrasion among crystals are insufficient, and the product does not easily form spheres, although the crystal size is larger. That is, it has been a dilemma to control the particle size and sphericity of crystals by adjusting conditions in the evaporative crystallization process, and thus both a sufficiently large particle size and a sufficiently high sphericity is difficult to obtain.

This invention solves the above-mentioned problems.

INVENTION SUMMARY

Aiming at the defects of the prior art, the invention provides a large-particle spherical salt and a preparation method thereof. The large-particle spherical salt prepared by the invention has the following remarkable advantages: firstly, the crystal fluidity is good, and the salt does not easily agglomerate. Secondly, the large-particle spherical salt has a good appearance and can be combined with other substances, so that the additional value of the salt is increased. Meanwhile, the preparation method of the large-particle spherical salt provided by the invention has many applications, such as edible salt, nutrient salt, foot bath salt, etc. The salt preparation method is easy to conduct and control, and provides salt having a high safety level, e.g. food grade level.

First, the invention provides a large-large spherical salt with a particle size of 400-950 μm and a sphericity of 0.5-1.0. The large-particle spherical salt is obtained by evaporating a saturated solution of sodium chloride, and adding gum Arabic into the saturated solution of sodium chloride, e.g. an amount of 0.5-5% of the sodium chloride mass of gum Arabic is added into the saturated solution of sodium chloride. The large spherical sodium chloride may have a particle size of 600-925 μm and a sphericity of 0.52-0.95, a particle size of 684-922 μm and a sphericity of 0.685-0.904 or a particle size of 739.388-921.593 μm and a sphericity of 0.721-0.904.

The large-particle spherical salt may have an average particle size of 921.593 μm and an average sphericity of 0.904, which is obtained by evaporating a saturated solution of sodium chloride with some gum arabic therein, for example, 2% of the sodium chloride mass of gum Arabic is added in the saturated solution of sodium chloride.

Second, the present invention provides a method for preparing the large-particle spherical salt, comprising:

(1) preparing a saturated solution of sodium chloride in a crystallizer, adding gum arabic into the saturated solution, then heating, stirring and evaporating the saturated solution to form crystals; and (2) filtering and drying the crystals to obtain the large-particle spherical salt.

The morphology of the large-particle spherical salt was observed under a polarizing microscope. The particle size and particle size distribution of the large-particle spherical salt was determined using a particle size analyzer, and the sphericity of the large-particle spherical salt was measured using a particle shape meter.

In some embodiments, the mass of the gum arabic added in the step (1) is 0.5-5% of the mass of the sodium chloride in the saturated solution, the heating temperature is 55-75° C., the stirring rate is 300-400 rpm, and/or the evaporating time is 4-12 h.

In some other embodiments, the mass of the gum Arabic added is 2% of the mass of the sodium chloride in the saturated solution, the heating temperature is 60° C., the stirring rate is 350 rpm, and/or the evaporating time is 8 h.

In some embodiments, the method further comprises inducing crystals for a period of 38-65 min, at an evaporation temperature of 55-75° C. The period for inducing the crystals is mainly related to the evaporation temperature. A shorter crystal induction period helps the crystal nucleation. The evaporation time is calculated from the moment when the crystals begin to form a crystal nucleus to the moment when evaporating the saturated solution is terminated.

In another embodiment, a saturated solution of sodium chloride is prepared at 55-75° C. The solution contains a ratio of about 37-38 g of sodium chloride per 100 mL of distilled water. The temperature at which the saturated solution of sodium chloride is prepared may be maintained as the evaporation temperature in the subsequent heating, stirring and evaporation process.

In other embodiments, the drying temperature may be 60° C. and the drying time may be 2 h.

The large-particle spherical salt provided by the invention can be used as an edible salt, a nutrient salt, a foot bath salt, and the like Compared with the prior art, the invention has the following beneficial effects:

1. According to the invention, in the process of evaporating and crystallizing sodium chloride, 0.5-5% gum arabic (based on the mass of sodium chloride in a saturated solution) is added into the saturated solution. The large-particle spherical salt obtained has an average particle size of 400-950 μm, and an average sphericity of 0.5-1.0.

2. In a preferred embodiment of the present invention, the process for preparing the large-particle spherical salt is further optimized by adding 2% of gum arabic based on the sodium chloride mass in the saturated solution, heating the saturated solution at 60° C., and stirring the saturated solution at 350 rpm for 8 h. A large-particle spherical salt with a particle size of 921.593 pun and a sphericity of 0.904 is successfully obtained. The large-particle spherical salt was placed at an ambient temperature of 23° C. and an ambient humidity of 15 percent, with no obvious agglomeration found after 30 days.

3. The large-particle spherical salt prepared by the invention has a uniform particle size distribution, and most of the salt is spherical, with a smooth and round surface. The particle size variation is almost at the same level under a low-power microscope (at a magnification of 4 times) as at no magnification.

4. The large-particle spherical salt provided by the invention has a good appearance, and can be combined with other substances, which increases the value of the salt.

5. The salt preparation method is simple and highly controllable. Gum arabic (a mixture of glycoproteins and polysaccharides predominantly containing arabinose and galactose, that is soluble in water; traditionally, a gum consisting of the sap of certain species of the acacia tree, although the term "gum arabic" does not indicate a particular botanical source) is commonly used in the food industry and soft-drink industry as a stabilizer and to improve the viscosity of food, with non-toxic and harmless effects. Thus, the large-particle spherical salt prepared by the present method has acceptable food safety properties and can be used as an edible salt, a nutrient salt, and a foot bath or other salt.

DRAWINGS

Figure 1:
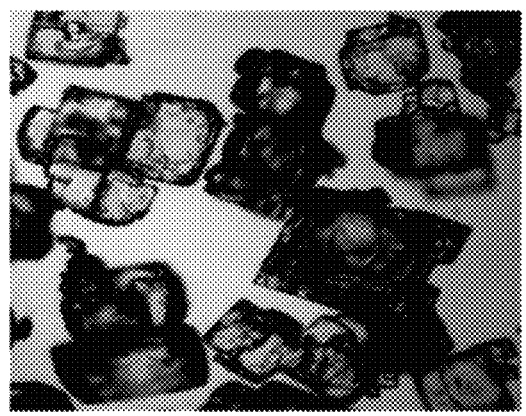
FIG. 1 is an EMS map of the surface of the particulate salt prepared in comparative example 1.
Figure 2:
FIG. 2 is an EMS map of the surface of the particulate salt prepared in comparative example 2.
Figure 3:
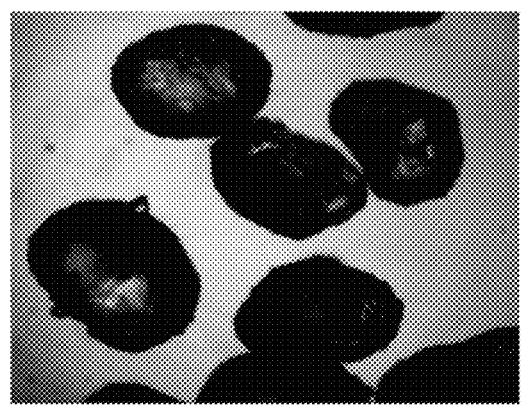
FIG. 3 is an EMS map of the surface of the large particle spherical salt prepared in exemplary embodiment 1.
Figure 4:
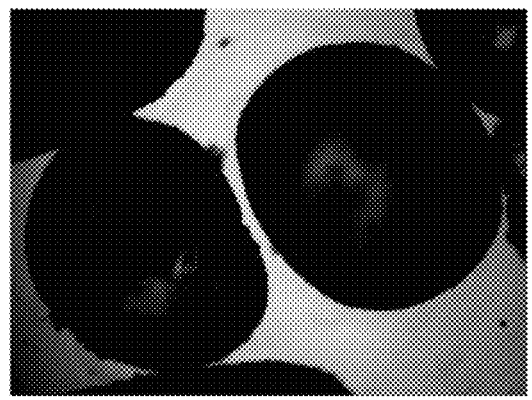
FIG. 4 is an EMS map of the surface of the large particle spherical salt prepared in exemplary embodiment 2.
Figure 5:
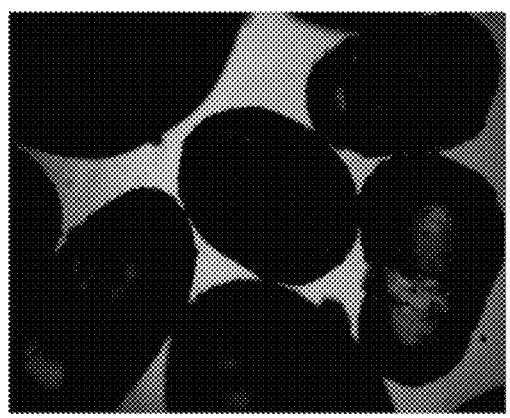
FIG. 5 is an EMS map of the surface of the large particle spherical salt prepared in exemplary embodiment 3.
Figure 6:
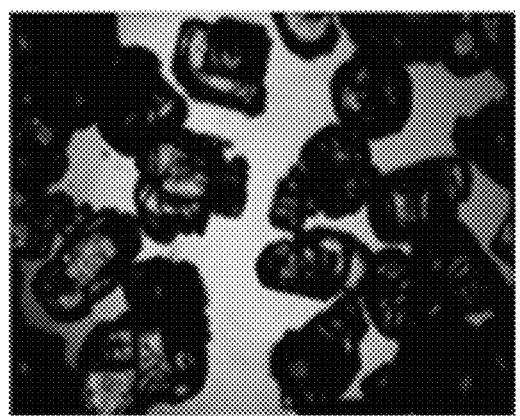
FIG. 6 is an EMS map of the surface of the large particle spherical salt prepared in exemplary embodiment 4.
Figure 7:
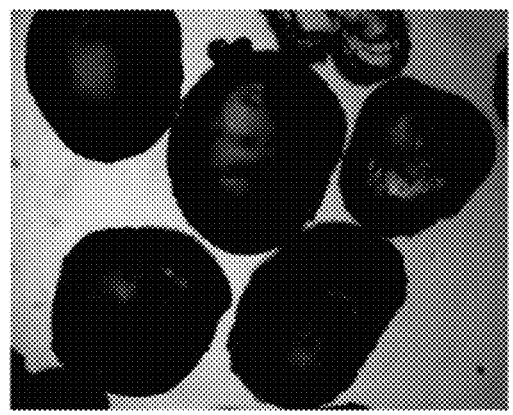
FIG. 7 is an EMS map of the surface of the large particle spherical salt prepared in exemplary embodiment 5.
Figure 8:
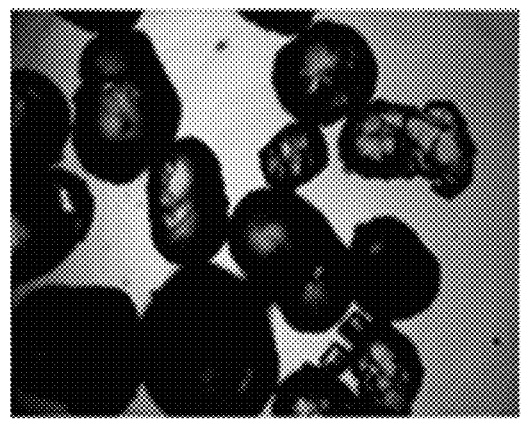
FIG. 8 is an EMS map of the surface of the large particle spherical salt prepared in exemplary embodiment 6.
Figure 9:
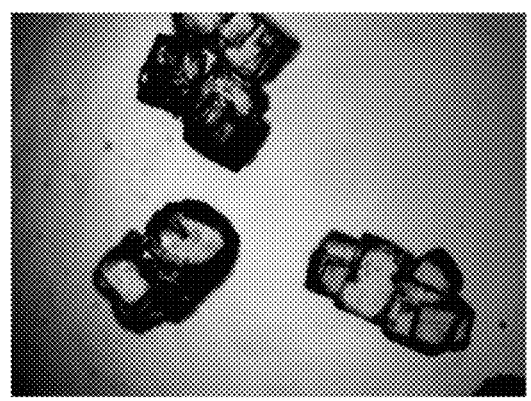
FIG. 9 is an EMS map of the surface of the large particle spherical salt prepared in exemplary embodiment 7.
Figure 10:
FIG. 10 is an EMS map of the surface of the large particle spherical salt prepared in exemplary embodiment 8.
Figure 11:
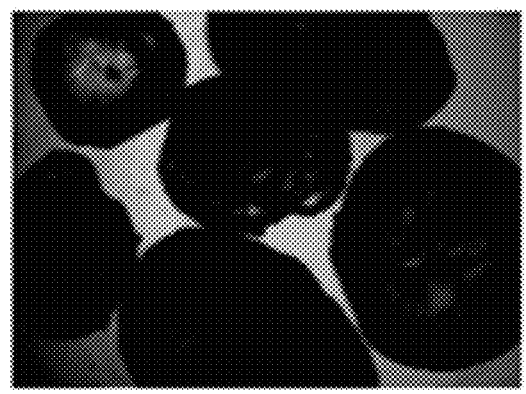
FIG. 11 is an EMS map of the surface of the large particle spherical salt prepared in exemplary embodiment 9.
Figure 12:
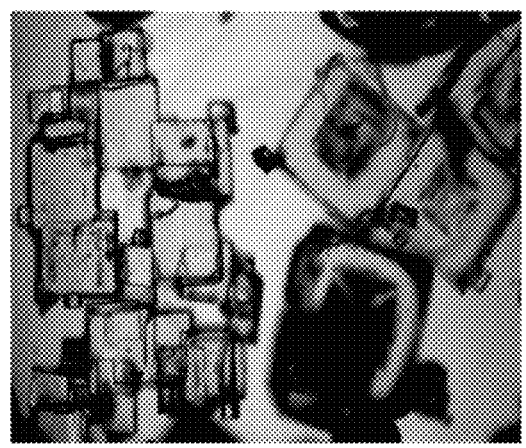
FIG. 12 is an EMS map of the surface of the large particle spherical salt prepared in exemplary embodiment 10
Figure 13:
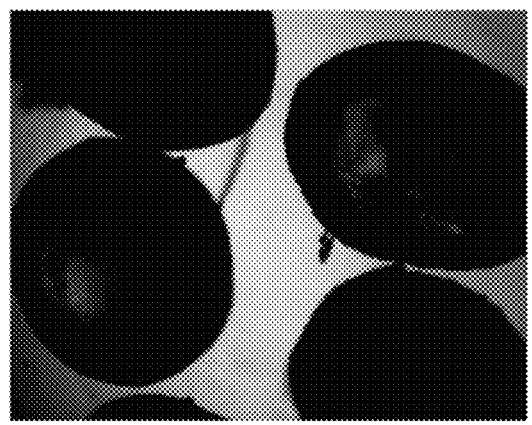
FIG. 13 is an EMS map of the surface of the large particle spherical salt prepared in exemplary embodiment 11.
Figure 14:
FIG. 14 is an EMS map of the surface of the large particle spherical salt prepared in exemplary embodiment 12.
Figure 15:
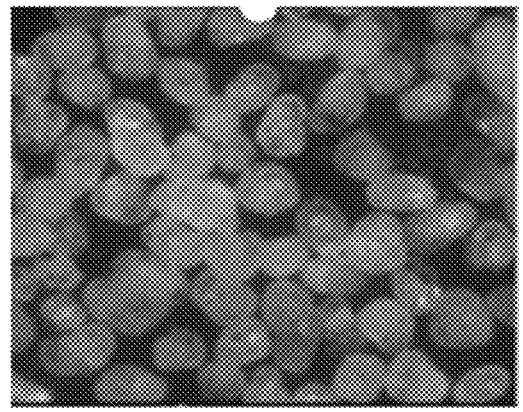
FIG. 15 is an EMS map of the surface of the large particle spherical salt prepared in exemplary embodiment 2.

The magnification of FIGS. 1-14 is 40, and the magnification of FIG. 15 is 4.

DETAILED DESCRIPTION

The present invention will be described below with reference to specific examples, but the embodiments of the present invention are not limited thereto.

The morphology of the large-particle spherical salt was observed under a polarization microscope (EMS) in the following comparative examples and exemplary embodiments. The particle size and particle size distribution of the large-particle spherical salt were measured by a particle size analyzer, and the sphericity of the large-particle spherical salt was measured by a particle shape meter.

Comparative Example 1

300 mL of a saturated solution of sodium chloride was prepared, the saturated solution was placed in a crystallizer, heated at a constant temperature in a water bath, and evaporated at a temperature of 60° C. for 8 hours with stirring at a stirring speed of 350 rpm, until a large number of crystals were formed. The saturated solution was filtered and the crystals were dried in an oven at a temperature of 60° C. for 2 hours to obtain a granular salt reference sample 1. The crystal shape was observed under a polarizing microscope (see FIG. 1). The particle size of the crystal was 382.744 in as measured by a particle size analyzer, and the sphericity of the crystal was 0.136 as measured by a particle shape meter.

Comparative Example 2

300 mL of a saturated solution of sodium chloride was prepared in a crystallizer. 2% glycine by mass of the sodium chloride in the saturated solution was added, heated at a constant temperature in a water bath, and evaporated at 60° C. for 8 hours with stirring the solution at a stirring speed of 350 rpm to form a large number of crystals. The solution was filtered and the crystals were dried in an oven at 60° C. for 2 hours to obtain a granular salt reference sample 2. The shape of the crystal was observed under a microscope (see FIG. 2). The particle size of the crystal was 391.628 μm as measured by a particle size analyzer, and the sphericity of the crystal was 0.426 as measured by a particle shape meter.

Examples 1 to 12

In examples 1-12, large particle spherical salt samples 1-12 were prepared, respectively, using substantially the same procedure as in comparative example 2, except that the additive, the amount of additive added (relative to the mass of the sodium chloride in the saturated solution), the evaporation temperature, the stirring rate during evaporation, and the evaporation time were varied, as shown in table 1. The particle size and particle size distribution of the large-particle spherical salt samples 1 to 12 were measured by a particle size analyzer, and the sphericity of the large-particle spherical salt samples 1 to 12 was measured by a particle shape meter. The results are shown in Table 1.

TABLE 1

Preparation conditions for large particle spherical salt samples 1-12 and their particle sizes and sphericities

| Embodiment | Sample | Additive | Additive percentage (%) | Evaporation Temp (° C.) | Stirring rate (rpm) | Evaporation duration (h) | Particle size (μm) | Sphericity |
|---|---|---|---|---|---|---|---|---|
| Comparative example 1 | Particle salt comparative example 1 | N/A | N/A | 60 | 350 | 8 | 382.744 | 0.136 |
| Comparative example 2 | Particle salt comparative example 2 | Glycine | 2 | 60 | 350 | 8 | 391.628 | 0.426 |
| Embodiment 1 | Large particle spherical salt sample 1 | gum arabic | 0.5 | 60 | 350 | 8 | 403.597 | 0.596 |
| Embodiment 2 | Large particle spherical salt sample 2 | gum arabic | 2 | 60 | 350 | 8 | 921.593 | 0.904 |
| Embodiment 3 | Large particle spherical salt sample 3 | gum arabic | 5 | 60 | 350 | 8 | 748.625 | 0.685 |
| Embodiment 4 | Large particle spherical salt sample 4 | gum arabic | 2 | 60 | 250 | 8 | 388.942 | 0.316 |
| Embodiment 5 | Large particle spherical salt sample 5 | gum arabic | 2 | 60 | 300 | 8 | 789.642 | 0.721 |
| Embodiment 6 | Large particle spherical salt sample 6 | gum arabic | 2 | 60 | 400 | 8 | 414.051 | 0.532 |
| Embodiment 7 | Large particle spherical salt sample 7 | gum arabic | 2 | 60 | 350 | 2 | 486.354 | 0.236 |
| Embodiment 8 | Large particle spherical salt | gum arabic | 2 | 60 | 350 | 4 | 739.388 | 0.831 |

TABLE 1-continued

Preparation conditions for large particle spherical salt samples 1-12 and their particle sizes and sphericities

| Embodiment | Sample | Additive | Additive percentage (%) | Evaporation Temp (° C.) | Stirring rate (rpm) | Evaporation duration (h) | Particle size (μm) | Sphericity |
|---|---|---|---|---|---|---|---|---|
| Embodiment 9 | Large particle spherical salt sample 9 | gum arabic | 2 | 60 | 350 | 12 | 684.592 | 0.774 |
| Embodiment 10 | Large particle spherical salt sample 10 | gum arabic | 2 | 45 | 350 | 8 | 604.715 | 0.154 |
| Embodiment 11 | Large particle spherical salt sample 11 | gum arabic | 2 | 55 | 350 | 8 | 893.569 | 0.892 |
| Embodiment 12 | Large particle spherical salt sample 12 | gum arabic | 2 | 75 | 350 | 8 | 628.939 | 0.528 |

As can be seen from Table 1, compared with the granular salt in comparative samples 1-2, the particle sizes of the large-particle spherical salt samples 1-12 are significantly increased, and the sphericities are also significantly improved under the conditions of well-controlled stirring rate, temperature, evaporation duration and the like.

Comparing the large particle spherical salt samples 1 to 3, it can be seen that adding more gum arabic increases the particle size and sphericity of the large particle spherical salt, but when the amount of gum arabic increases beyond a certain amount, the particle size and sphericity are reduced. Comparing the large particle spherical salt samples 2 and 4-6, it can be seen that the particle size and sphericity of the large particle spherical salt can be increased by properly increasing the stirring rate during the evaporation process, but the particle size and sphericity can decrease when the stirring rate increases beyond a certain rate. Comparing the large-particle spherical salt samples 2 and 7-9, it can be seen that when the evaporation time is less than the ideal length, the crystals are not completely formed, and the particle size and the sphericity of the crystals are relatively low. When the evaporation time is longer than ideal, a large number of crystals collide and wear, and the particle size and the sphericity of the crystals are relatively low. When the evaporation duration is 8 hours, the sphericity of the crystals is the best, and the particle size is the largest. Comparing the large-particle spherical salt samples 2 and 10-12, it can be seen that the evaporation temperature has a great influence on the particle size and sphericity of the large-particle spherical salt, when the temperature is less than ideal, the nucleation and growth of the crystal is relatively difficult, leading to relatively small particle size and sphericity of the crystal, a relatively low yield and relative difficulty for actual production. When the temperature is relatively high, the particle size and sphericity are relatively low due to over-evaporation Under ideal temperature conditions, the sphericity of the salt reached as high as 0.904 at an evaporation temperature of 60° C., and when the evaporation temperature was slightly decreased to 55° C., the sphericity still reached 0.892.

Embodiment 13

The granular salt reference sample 1, the granular salt reference sample 2, the large-particle spherical salt sample 2 and the large-particle spherical salt sample 6 were respectively stored at an ambient temperature of 23° C. and an ambient humidity of 15% for 30 days, and each sample was observed. The granular salt reference sample 1 and the granular salt reference sample 2 showed caking phenomena of different degrees, but the large-particle spherical salt sample 2 and the large-particle spherical salt sample 6 had no obvious caking phenomenon. In particular, the large-particle spherical salt sample 2 shows almost no caking phenomenon and has good fluidity, and the reason for the phenomenon is that the spherical salt has a smaller contact area and better fluidity than a cubic salt crystal. Also, the spherical salt prepared by this invention has larger particle size, which does not easily aggregate and agglomerate

What is claimed:

1. A method for preparing sodium chloride crystals, comprising:
   (1) preparing a saturated solution of sodium chloride in a crystallizer, adding gum arabic into the saturated solution in a mass percentage of 0.5-5% of a mass of the sodium chloride in the saturated solution, then heating the saturated solution at a temperature of 55-75° C., stirring at a rate of 300-400 rpm, and evaporating the saturated solution for a time of 4-12 hours to form the sodium chloride crystals; and
   (2) filtering and drying the sodium chloride crystals, wherein the sodium chloride crystals have a particle size of 400-950 μm and a sphericity of 0.5-1.0 after filtering and drying.

2. The method of claim 1, wherein the mass percentage of the gum arabic is 2% of the sodium chloride in the saturated solution, the temperature is 60° C., the rate is 350 rpm, and the evaporation time is 8 hours.

3. The method of claim 1, wherein the crystals are dried at a temperature of 60° C. for a time of 2 hours.

4. The method of claim 1, wherein the mass percentage of the gum arabic is 2% of the sodium chloride in the saturated solution.

5. The method of claim 1, wherein the temperature is 60° C.

6. The method of claim 1, wherein the rate is 350 rpm.

7. The method of claim 1, wherein the evaporation time is 8 hours.

8. The method of claim 1, wherein the crystals are dried at a temperature of 60° C.

9. The method of claim 1, wherein the crystals are dried for a time of 2 hours.

10. The method of claim 1, wherein the time for evaporating the saturated solution is calculated from a moment when the sodium chloride crystals begin to form a crystal nucleus to a moment when evaporating the saturated solution is terminated.

11. The method of claim 1, wherein the saturated solution of sodium chloride is prepared at 55-75° C.

12. The method of claim 1, wherein the saturated solution of sodium chloride contains the sodium chloride and distilled water.

13. The method of claim 12, wherein the sodium chloride and the distilled water are present in a ratio of about 37-38 g of the sodium chloride per 100 mL of the distilled water.

14. The method of claim 1, wherein the particle size is 600-925 μm and the sphericity is 0.52-0.95.

15. The method of claim 14, wherein the particle size is 684-922 μm and the sphericity is 0.685-0.904.

16. The method of claim 15, wherein the particle size is 739.388-921.593 μm and the sphericity is 0.721-0.904.

17. The method of claim 1, further comprising determining the particle size and a particle size distribution of the sodium chloride crystals using a particle size analyzer.

18. The method of claim 17, further comprising measuring the sphericity of the sodium chloride crystals using a particle shape meter.

\* \* \* \* \*